(12) United States Patent
Tani et al.

(10) Patent No.: US 12,430,695 B2
(45) Date of Patent: Sep. 30, 2025

(54) INFORMATION PROCESSING APPARATUS, CONTROL METHOD, AND PROGRAM

(71) Applicant: NEC Corporation, Tokyo (JP)

(72) Inventors: Masahiro Tani, Tokyo (JP); Kazufumi Kojima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/240,152

(22) Filed: Aug. 30, 2023

(65) Prior Publication Data

US 2023/0410220 A1 Dec. 21, 2023

Related U.S. Application Data

(63) Continuation of application No. 17/043,291, filed as application No. PCT/JP2018/013880 on Mar. 30, 2018, now abandoned.

(51) Int. Cl.
*G06Q 50/00* (2024.01)
*G06F 16/9536* (2019.01)
*G06F 18/22* (2023.01)
*G06V 10/75* (2022.01)
*G10L 17/26* (2013.01)

(52) U.S. Cl.
CPC ......... *G06Q 50/01* (2013.01); *G06F 16/9536* (2019.01); *G06F 18/22* (2023.01); *G06V 10/758* (2022.01); *G10L 17/26* (2013.01)

(58) Field of Classification Search
CPC ..... G06Q 50/01; G06F 16/9536; G06F 18/22; G06V 10/758; G10L 17/26
See application file for complete search history.

(56) References Cited

U.S. PATENT DOCUMENTS

| | | | |
|---|---|---|---|
| 8,209,339 B1 | 6/2012 | Tong | |
| 9,043,329 B1* | 5/2015 | Patton | ................... G06F 16/951 |
| | | | 707/740 |
| 9,208,171 B1 | 12/2015 | Cotting et al. | |
| 9,332,031 B1* | 5/2016 | Kappiah | ................. G06F 17/40 |
| 11,094,335 B1 | 8/2021 | Wang et al. | |
| 11,409,825 B2* | 8/2022 | Kelly | .................... G06F 16/906 |
| 2002/0078043 A1* | 6/2002 | Pass | .................... G06F 16/5838 |

(Continued)

FOREIGN PATENT DOCUMENTS

| | | |
|---|---|---|
| JP | 2009-169901 A | 7/2009 |
| JP | 2013-210781 A | 10/2013 |

(Continued)

OTHER PUBLICATIONS

Kevin S. Xu, Revealing Social Networks of Spammers Through Spectral Clustering, Apr. 30, 2013, arXiv, pp. 1-6 (Year: 2013).*

(Continued)

*Primary Examiner* — Nilesh B Khatri

(57) ABSTRACT

An information processing apparatus (2000) determines whether a content (30-1) of a relevant account (20-1) associated with a target account (10-1) and a content (30-2) of a relevant account (20-2) associated with a target account (10-2) are similar. When the content (30-1) and the content (Continued)

(30-2) are similar, the information processing apparatus (2000) executes predetermined processing related to the target account (10-1) and the target account (10-2).

7 Claims, 9 Drawing Sheets

(56) References Cited

U.S. PATENT DOCUMENTS

| | | | |
|---|---|---|---|
| 2002/0131641 A1* | 9/2002 | Luo | G06F 18/21 382/218 |
| 2009/0187403 A1 | 7/2009 | Nomitsu | |
| 2011/0320560 A1* | 12/2011 | Bennett | G06Q 30/0261 709/217 |
| 2012/0101808 A1 | 4/2012 | Duong-Van | |
| 2013/0287269 A1 | 10/2013 | Gossweiler et al. | |
| 2014/0133757 A1 | 5/2014 | Gossweiler et al. | |
| 2015/0019345 A1 | 1/2015 | Masuko | |
| 2015/0067883 A1 | 3/2015 | Shen et al. | |
| 2015/0120583 A1* | 4/2015 | Zarrella | G06F 16/906 705/317 |
| 2015/0186787 A1* | 7/2015 | Kumar | G06Q 10/107 707/758 |
| 2015/0304437 A1 | 10/2015 | Vaccari et al. | |
| 2016/0093123 A1 | 3/2016 | Zinchenko et al. | |
| 2016/0308966 A1 | 10/2016 | Zhang et al. | |
| 2017/0235726 A1 | 8/2017 | Wang et al. | |
| 2017/0262472 A1 | 9/2017 | Goldenberg | |
| 2018/0129929 A1 | 5/2018 | Shigenaka | G06N 3/08 |
| 2018/0246567 A1* | 8/2018 | Campbell | G06V 40/382 |
| 2018/0365508 A1* | 12/2018 | Kim | G06V 20/62 |
| 2020/0012969 A1* | 1/2020 | Jiang | G06F 18/22 |

FOREIGN PATENT DOCUMENTS

| | | |
|---|---|---|
| JP | 2015-519645 A | 7/2015 |
| JP | 2017-112448 A | 6/2017 |
| JP | 2017-142796 A | 8/2017 |
| JP | 2018-037076 A | 3/2018 |

OTHER PUBLICATIONS

Yongjun Li et al., "User Identification Based on Display Names Across Online Social Networks", IEEE Access, pp. 17342 to 17353, Aug. 25, 2017, vol. 5, 12 pages.

International Search Report for PCT/JP2018/013880 dated Jul. 3, 2018.

US Office Action for U.S. Appl. No. 17/043,291, mailed on Jul. 20, 2023.

US Office Action for U.S. Appl. No. 17/043,291, mailed on Nov. 3, 2023.

US Office Action for U.S. Appl. No. 18/240,160, mailed on Aug. 28, 2024.

* cited by examiner

INFORMATION PROCESSING APPARATUS, CONTROL METHOD, AND PROGRAM

CROSS REFERENCE TO RELATED APPLICATIONS

This application is a Continuation of U.S. application Ser. No. 17/043,291 filed on Sep. 29, 2020, which is a National Stage of International Application No. PCT/JP2018/013880 filed on Mar. 30, 2018.

TECHNICAL FIELD

The present invention relates to a user account.

BACKGROUND ART

Some services, such as a social networking service (SNS), provide an environment in which a user can take various types of actions by using a user account. For example, a picture, a moving image, or a text message can be uploaded in association with a user account.

Herein, the same person may own a plurality of accounts. With regard to this point, NPL 1 discloses a technique for determining whether a plurality of user accounts are owned by the same person, based on a similarity degree among user names of a plurality of the user accounts.

CITATION LIST

Non Patent Literature

[NPL1] Y. Li, Y. Peng, W. Ji, Z. Zhang, and Q. Xu, "User Identification Based on Display Names Across Online Social Networks", IEEE Access, vol. 5, pp. 17342 to 17353, Aug. 25, 2017

SUMMARY OF INVENTION

Technical Problem

In general, a user name registered in a user account can be any name unrelated to a real name of a user. Thus, a person who creates a plurality of user accounts can set user names registered in the user accounts to be not similar to each other. Then, in the technique in NPL 1, it is difficult to determine that a plurality of user accounts in which user names being not similar to each other in such a manner are registered are owned by the same person.

The invention of the present application has been made in view of the above-described problem, and is to provide a technique capable of accurately detecting whether user accounts being compared are owned by the same person even when user names of the user accounts are not similar to each other.

Solution to Problem

An information processing apparatus according to the present invention includes 1) a determination unit that determines, for a first relevant account associated with a first target account and a second relevant account associated with a second target account, whether first content data associated with the first relevant account and second content data associated with the second relevant account are similar, and 2) a processing execution unit that executes predetermined processing when it is determined that the first content data and the second content data are similar.

A control method according to the present invention is executed by a computer. The control method includes 1) a determination step of determining, for a first relevant account associated with a first target account and a second relevant account associated with a second target account, whether first content data associated with the first relevant account and second content data associated with the second relevant account are similar, and 2) a processing execution step of executing predetermined processing when it is determined that the first content data and the second content data are similar.

A program according to the present invention causes a computer to execute each step included in the control method according to the present invention.

Advantageous Effects of Invention

The present invention provides a technique capable of accurately detecting whether user accounts being compared are owned by the same person even when user names of the user accounts are not similar to each other.

BRIEF DESCRIPTION OF DRAWINGS

The above-described object, the other objects, features, and advantages will become more apparent from suitable example embodiments described below and the following accompanying drawings.

EXAMPLE EMBODIMENT

Hereinafter, example embodiments of the present invention will be described with reference to the drawings. Note that, in all of the drawings, the same components have the same reference signs, and description thereof will not be repeated as appropriate. Further, in each block diagram, each block represents a configuration of a functional unit instead of a configuration of a hardware unit unless otherwise described.

Example Embodiment 1

<Outline>

Figure 1:
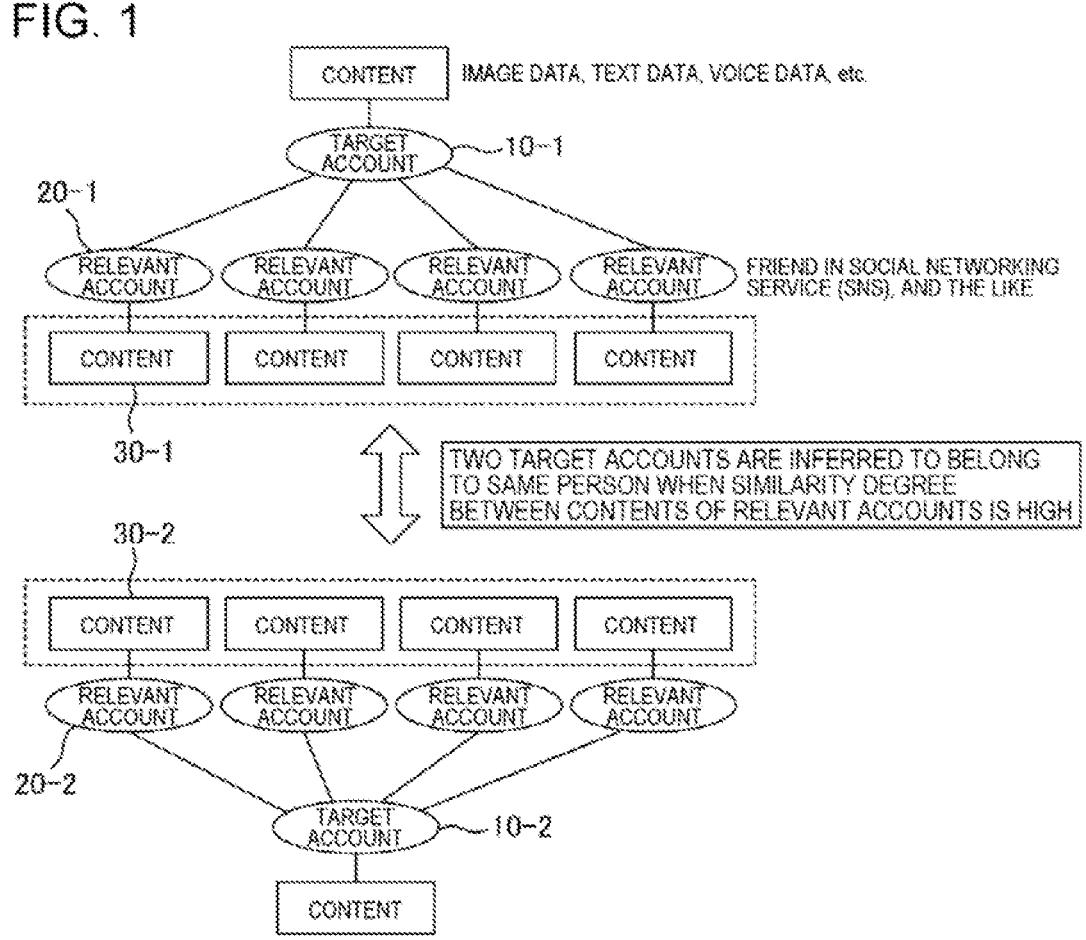
FIG. 1 is a diagram schematically illustrating processing executed by an information processing apparatus according to a present example embodiment.

FIG. 1 is a diagram schematically illustrating processing executed by an information processing apparatus 2000 according to the present example embodiment. The information processing apparatus 2000 infers whether owners having user accounts different from each other are the same person. For example, user information being information related to a user himself/herself and information (hereinafter, a content) such as image data and text data being registered in association with a user account are associated with the account. The user information is, for example, a name, an address, a phone number, an e-mail address, or the like.

In general, when a user account is created in a social networking service (SNS) and the like, a user inputs various types of user information described above. At this time, there are many cases where authenticity of a content of the input user information is not required to be proven. In such a case, the content of the user information can be even falsified. Thus, the same person can create a plurality of accounts having contents of user information different from each other. In other words, the same person can own a plurality of accounts. For a plurality of user accounts having a characteristic that "pieces of user information different from each other are registered even though actual owners are the same person" in such a manner, it is difficult to recognize a fact that the user accounts are owned by the same person from only the user information and a content of the user accounts.

Further, since a plurality of services such as the SNS are present, there is also a case where the same person creates user accounts with different account names in the plurality of services. In this case, even though a user registers user information without falsehood, when user information is private, it is difficult to recognize a fact that the plurality of user accounts are owned by the same person.

Thus, the information processing apparatus 2000 according to the present example embodiment infers user accounts different from each other being owned by the same person by using a content associated with another user account associated with a user account. Hereinafter, an account to be determined whether to be owned by the same person is expressed as a target account, and another account associated with the target account is referred to as a relevant account. For example, in the SNS, a function of associating user accounts with each other as friends is often provided. Thus, for example, an account associated as a friend of a target account is used as a relevant account. Note that which account is handled as a target account will be described below.

In the example in FIG. 1, the information processing apparatus 2000 determines, for two target accounts that are a target account 10-1 and a target account 10-2, whether the target accounts are accounts owned by the same person. For the target account 10-1, a plurality of relevant accounts 20 are present. Herein, the relevant account 20 associated with the target account 10-1 is expressed as a relevant account 20-1. In FIG. 1, only one of the plurality of relevant accounts 20-1 is provided with a reference sign for simplifying the diagram. A content associated with the relevant account 20-1 is expressed as a content 30-1. For example, the content 30-1 is image data uploaded in association with the relevant account 20-1, and the like. Similarly, a relevant account of the target account 10-2 is expressed as a relevant account 20-2, and a content associated with the relevant account 20-2 is expressed as a content 30-2. Hereinafter, the "content 30 associated with the relevant account 20" is also simply expressed as the "content 30 of the relevant account 20".

The information processing apparatus 2000 determines whether the content 30-1 of the relevant account 20-1 and the content 30-2 of the relevant account 20-2 are similar. When the content 30-1 and the content 30-2 are similar, the target account 10-1 and the target account 10-2 can be inferred to belong to the same person. Thus, when the content 30-1 and the content 30-2 are similar, the information processing apparatus 2000 executes predetermined processing related to the target account 10-1 and the target account 10-2. For example, the information processing apparatus 2000 outputs, as the predetermined processing, a notification indicating that the target account 10-1 and the target account 10-2 belong to the same person.

<Advantageous Effect>

The information processing apparatus 2000 according to the present example embodiment determines a similarity degree between the content 30-1 of the relevant account 20-1 associated with the target account 10-1 and the content 30-2 of the relevant account 20-2 associated with the target account 10-2. Herein, when the similarity degree is high, the target account 10-1 and the target account 10-2 can be inferred to be owned by the same person. The reason will be described below.

The relevant account 20-1 associated with the target account 10-1 conceivably belongs to a person who has some sort of connection with an owner of the target account 10-1, such as a friend of the owner of the target account 10-1, for example. Thus, there is a high probability that a content including some sort of information related to the target account 10-1 is present among the contents 30-1 uploaded and the like in association with the relevant accounts 20-1 by owners of the relevant accounts 20-1. In other words, there is a high probability that some sort of information related to the target account 10-1 is revealed in information opened by the relevant account 20-1. For example, there is a high probability that a picture and a moving image uploaded by the relevant account 20-1 include the owner of the target account 10-1, property (such as a vehicle) of the owner of the target account 10-1, a landmark representing a place where the target account 10-1 has visited, and the like. Further, there is a high probability that text data and voice data uploaded by the relevant account 20-1 also include some sort of information related to the target account 10-1.

Similarly, there is a high probability that a content including some sort of information related to the target account 10-2 is present among the contents 30-2 uploaded and the like in association with the relevant accounts 20-2 by owners of the relevant accounts 20-2. For this reason, it can be said that there is a high probability that the content 30-1 of the relevant account 20-1 and the content 30-2 of the relevant account 20-2 being similar indicates that information related to the target account 10-1 included in the content 30-1 and information related to the target account 10-2 included in the content 30-2 are similar.

Thus, when the content 30-1 and the content 30-2 are similar, the information processing apparatus 2000 infers that there is a high probability that the owner of the target account 10-1 and an owner of the target account 10-2 are the same person. In this way, even when it is not clear whether the target account 10-1 and the target account 10-2 are owned by the same person just by comparing the user information of the target account 10-1 with the user information of the target account 10-2, whether the target account 10-1 and the target account 10-2 are accounts owned by the same person can be inferred.

Note that the above-described description with reference to FIG. 1 is exemplification for facilitating understanding of the information processing apparatus 2000, and does not limit the function of the information processing apparatus 2000. Hereinafter, the information processing apparatus 2000 according to the present example embodiment will be described in more detail.

<Example of Functional Configuration of Information Processing Apparatus 2000>

Figure 2:
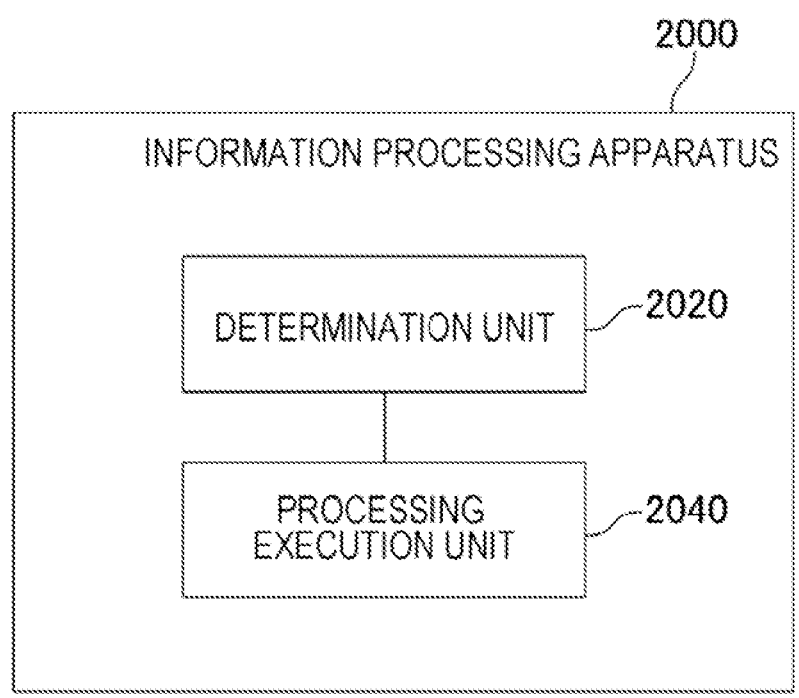
FIG. 2 is a diagram illustrating a functional configuration of an information processing apparatus according to an example embodiment 1.

FIG. 2 is a diagram illustrating a functional configuration of the information processing apparatus 2000 according to the example embodiment 1. The information processing apparatus 2000 includes a determination unit 2020 and a processing execution unit 2040. The determination unit 2020 determines whether the content 30-1 of the relevant account 20-1 associated with the target account 10-1 and the content 30-2 of the relevant account 20-2 associated with the target account 10-2 are similar. When the content 30-1 and the content 30-2 are similar, the processing execution unit 2040 executes predetermined processing related to the target account 10-1 and the target account 10-2.

<Hardware Configuration of Information Processing Apparatus 2000>

Each functional component unit of the information processing apparatus 2000 may be achieved by hardware (for example, a hard-wired electronic circuit and the like) that achieves each functional component unit, and may be achieved by a combination (for example, a combination of an electronic circuit and a program that controls the electronic circuit, and the like) of hardware and software. Hereinafter, a case where each functional component unit of the information processing apparatus 2000 is achieved by the combination of hardware and software will be further described.

Figure 3:
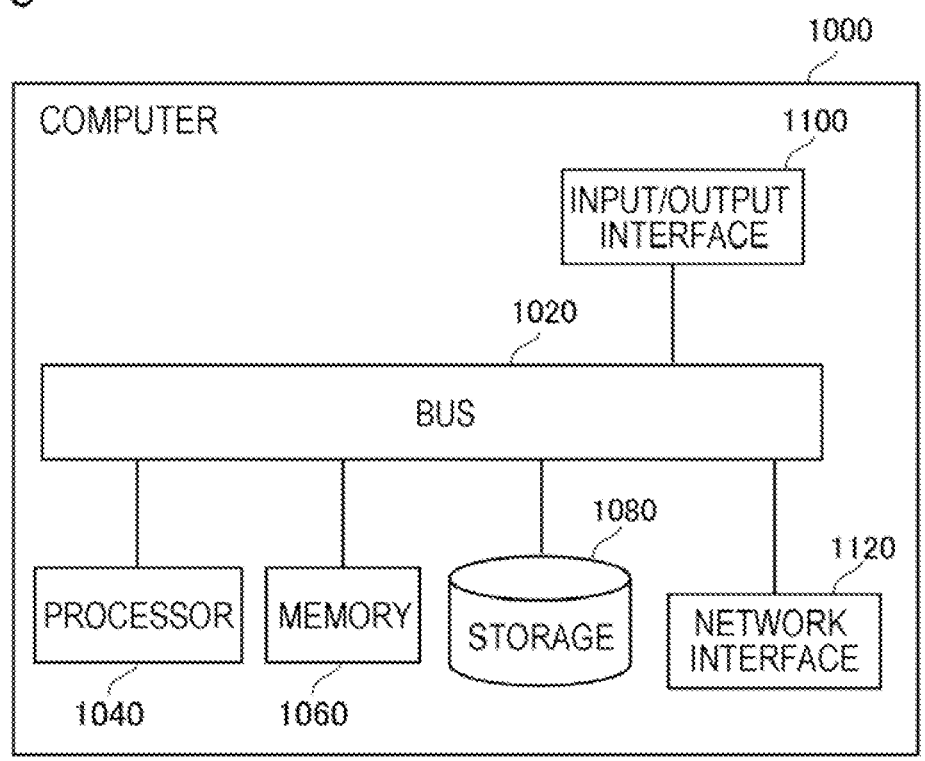
FIG. 3 is a diagram illustrating a computer for achieving the information processing apparatus.

FIG. 3 is a diagram illustrating a computer 1000 for achieving the information processing apparatus 2000. The computer 1000 is any computer. For example, the computer 1000 is a personal computer (PC), a server machine, or the like. The computer 1000 may be a dedicated computer designed for achieving the information processing apparatus 2000, and may be a general-purpose computer.

The computer 1000 includes a bus 1020, a processor 1040, a memory 1060, a storage device 1080, an input/output interface 1100, and a network interface 1120. The bus 1020 is a data transmission path for allowing the processor 1040, the memory 1060, the storage device 1080, the input/output interface 1100, and the network interface 1120 to transmit and receive data with one another. However, a method of connecting the processor 1040 and the like to each other is not limited to a bus connection.

The processor 1040 is various types of processors such as a central processing unit (CPU), a graphics processing unit (GPU), and a field-programmable gate array (FPGA). The memory 1060 is a main storage achieved by using a random access memory (RAM) and the like. The storage device 1080 is an auxiliary storages achieved by using a hard disk, a solid state drive (SSD), a memory card, a read only memory (ROM), or the like.

The input/output interface 1100 is an interface for connecting the computer 1000 and an input/output device. For example, an input apparatus such as a keyboard and an output apparatus such as a display apparatus are connected to the input/output interface 1100. The network interface 1120 is an interface for connecting the computer 1000 to a communication network. The communication network is, for example, a local area network (LAN) and a wide area network (WAN). A method of connection to the communication network by the network interface 1120 may be a wireless connection or a wired connection.

The storage device 1080 stores a program module that achieves each functional component unit of the information processing apparatus 2000. The processor 1040 achieves a function associated with each program module by reading each of the program modules to the memory 1060 and executing the read program module.

<Flow of Processing>

Figure 4:
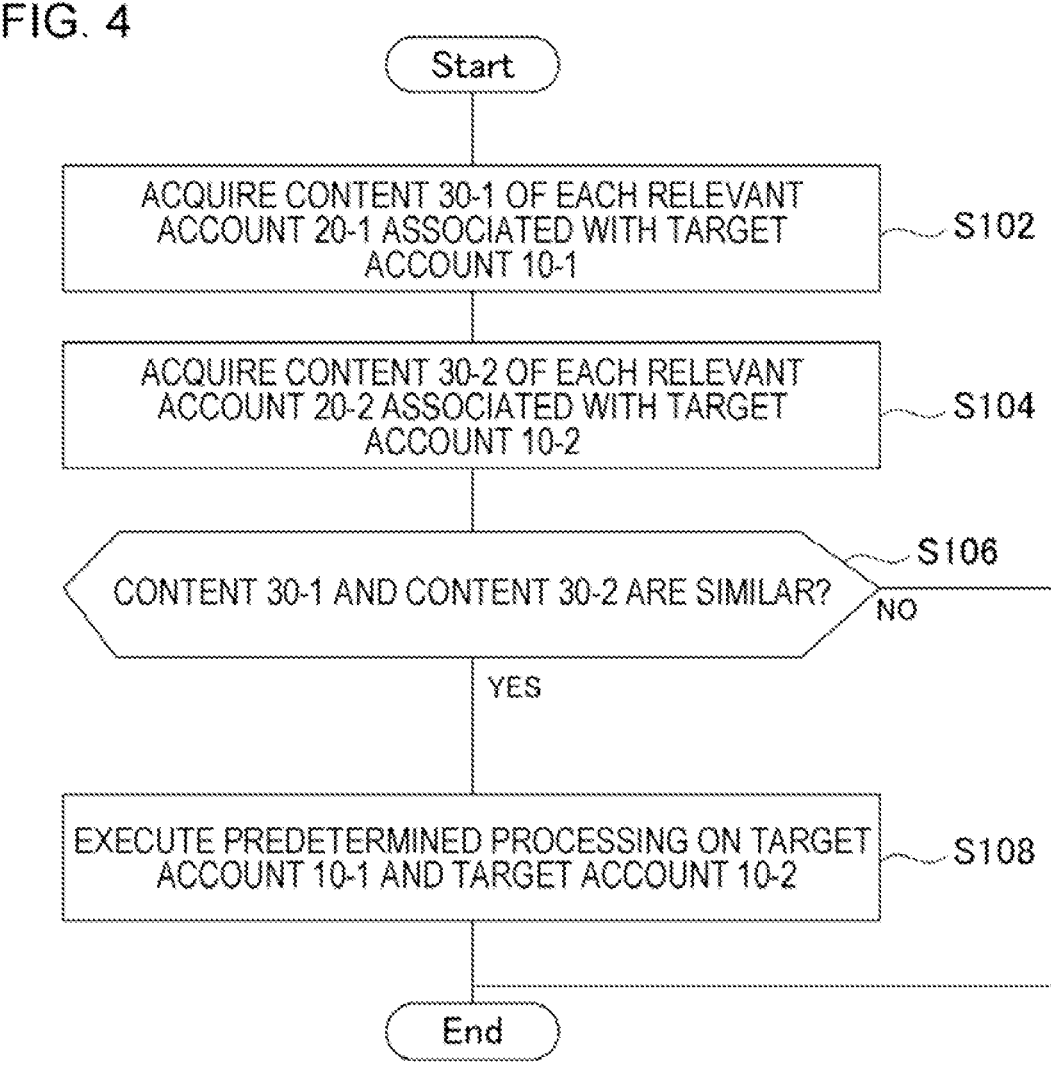
FIG. 4 is a flowchart illustrating a flow of processing executed by the information processing apparatus according to the example embodiment 1.

FIG. 4 is a flowchart illustrating a flow of processing executed by the information processing apparatus 2000 according to the example embodiment 1. The determination unit 2020 acquires the content 30-1 of each of the relevant accounts 20-1 associated with the target account 10-1 (S102). The determination unit 2020 acquires the content 30-2 of each of the relevant accounts 20-2 associated with the target account 10-2 (S104). The determination unit 2020 determines whether the content 30-1 and the content 30-2 are similar (S106). When the content 30-1 and the content 30-2 are similar (S106: YES), the processing execution unit 2040 executes predetermined processing (S108). On the other hand, when the content 30-1 and the content 30-2 are not similar (S106: NO), the processing in FIG. 4 ends.

<With Regard to User Account>

As described above, the target account 10 and the relevant account 20 are user accounts created by a user in a service such as the SNS, for example. In general, such a user account is created by registering user information such as a name, and is continuously used.

However, a user account handled by the information processing apparatus 2000 is not limited to a user account created by registering user information in such a manner. For example, on a bulletin board and the like on a Web page, when a user posts (uploads text data, and the like) a content, an identifier is assigned to the post. The information processing apparatus 2000 may handle the identifier as a user account. In this case, for example, when a certain user posts a content on a bulletin board site and another user comments on the post, one of the former and the latter can be handled as the target account 10 and the other can be handled as the relevant account 20.

<With Regard to Target Account 10>

The information processing apparatus 2000 infers, for two accounts of the target account 10-1 and the target account 10-2, whether the accounts belong to the same person. Herein, the target account 10-1 and the target account 10-2 may be user accounts for using the same service (for example, the SNS), or may be user accounts for using services different from each other.

Herein, there are various methods as a method of determining which user account among a plurality of user accounts is handled as the target account 10. Hereinafter, a variation of the methods is illustrated.

<<Method 1 of Determining Target Account 10>>

For example, the information processing apparatus 2000 receives a specification of a user account handled as the target account 10 from a user of the information processing apparatus 2000. The user account specified by a user may be two, or may be three or more. When three or more user accounts are specified, for example, the information processing apparatus 2000 executes, for each combination (n-2 combination) of any two user accounts creatable for the specified user accounts, processing handling two user accounts included in the combination as the target accounts 10. In other words, when user accounts of A, B, and C are specified, processing handling A and B as the target accounts 10, processing handling A and C as the target accounts 10, and processing handling B and C as the target accounts 10 are each executed.

<<Method 2 of Determining Target Account 10>>

For example, the information processing apparatus 2000 receives, from a user, an input that specifies one user account handled as the target account 10. The information processing apparatus 2000 handles the user account specified by a user as the target account 10-1. Furthermore, the information processing apparatus 2000 handles, as the target account 10-2, another user account having user information similar to user information of the target account 10-1. The similarity between pieces of user information herein refers to, for example, a part of various pieces of information (a part of a user ID, a part of a name, a part of a birth date, a part of an e-mail address, or the like) being common. When a plurality of other user accounts having user information similar to the user information of the target account 10-1 are present, the information processing apparatus 2000 handles each of the plurality of user accounts as the target account 10-2.

<<Method 3 of Determining Target Account 10>>

The information processing apparatus 2000 may operate in cooperation with a monitoring system for monitoring a user account, and receive a specification of a user account from the monitoring system. For example, the monitoring system monitors a usage aspect (such as a content of an uploaded content and a frequency of uploading) of a user account, and determines a user account whose usage aspect violates common sense, a user policy of a service, law, or the like (that is, determines a user account to beware of). The monitoring system notifies the determined user account to the information processing apparatus 2000. The information processing apparatus 2000 executes, for each combination of any two user accounts creatable for the plurality of user accounts notified from the monitoring system, processing handling the two user accounts included in the combination as the target accounts 10. Note that, when the monitoring system notifies user accounts one by one, the information processing apparatus 2000 executes the above-described processing on a plurality of user accounts indicated by a plurality of notifications received during a predetermined period of time, for example.

<With Regard to Relevant Account 20>

As described above, the relevant account 20 is another account associated with the target account 10, and is an account in a friendship with the target account 10 in the SNS, for example. When the plurality of relevant accounts 20 are associated with the target account 10, the determination unit 2020 may acquire the content 30 for all of the relevant accounts 20, and may acquire the content 30 for some of the relevant accounts 20. When the content 30 is acquired for some of the relevant accounts 20, the determination unit 2020 arbitrarily (for example, randomly) selects a predetermined number of the relevant accounts 20 from the plurality of relevant accounts 20, for example.

<Acquisition of Content 30: S102 and S104>

The determination unit 2020 acquires the content 30-1 associated with the relevant account 20-1 and the content 30-2 associated with the relevant account 20-2 (S102 and S104). For example, the determination unit 2020 automatically collects, for each of the relevant accounts 20, each of the contents 30 from Web pages on which the contents 30 of the relevant accounts 20 are opened, by successively accessing the Web pages.

Further, an application programming interface (API) for acquiring a content associated with a user account may be provided in a service such as the SNS. Thus, the determination unit 2020 may acquire the content 30 of the relevant account 20 by using the API provided in a service used by the relevant account 20.

Note that the determination unit 2020 may acquire all of the contents 30 associated with the relevant account 20, and may acquire only the content 30 of a predetermined type. For example, when a target of a similarity determination is only image data, the determination unit 2020 acquires image data associated with the relevant account 20 as the content 30.

<Comparison Between Pieces of Content Data: S106>

The determination unit 2020 compares content data of the relevant account 20-1 with content data of the relevant account 20-2, and infers that, when a similarity degree between the pieces of the content data is high, the target account 10-1 and the target account 10-2 are owned by the same person. The processing may adopt various variations in points that 1) what kind of content data is to be compared and 2) what kind of comparison is performed. Hereinafter, a comparison between pieces of content data will be described while focusing on the two points.

<<Comparison Between Pieces of Image Data>>

Image data are conceivable as a type of the content data to be compared. For example, in the SNS, image data of a picture of a person, a building, scenery, or the like are uploaded by using a user account. The determination unit 2020 handles image data uploaded by using a user account in such a manner as a content associated with the user account. Further, a user may make a post that refers to (links) a Web page including image data, and make a post that refers to image data uploaded by another user. The determination unit 2020 may also handle image data referred by a user in such a manner as content data associated with an account of the user. Note that a moving image frame constituting moving image data is also included in image data. Using image data has an advantage that similarity between the content 30-1 and the content 30-2 is easily determined even when a language used in the relevant account 20-1 is different from a language used in the relevant account 20-2. Hereinafter, a few specific comparison methods related to image data are illustrated.

<<<Comparison Method 1 Related to Image Data>>>

The determination unit 2020 focuses on a similarity degree between an object detected from image data associated with the relevant account 20-1 and an object detected from image data associated with the relevant account 20-2. For example, the determination unit 2020 calculates the similarity degree between the object detected from the image data associated with the relevant account 20-1 and the object detected from the image data associated with the relevant account 20-2. Then, when the number of groups (namely, groups of objects inferred to be the same) of objects having a similarity degree equal to or more than a predetermined value is equal to or more than a predetermined number, the determination unit 2020 determines that the similarity degree between the content data of the relevant account 20-1 and the content data of the relevant account 20-2 is high. On the other hand, when the number of groups of objects having a similarity degree equal to or more than the predetermined value is less than the predetermined number, the determination unit 2020 determines that the similarity degree between the content data of the relevant account 20-1 and the content data of the relevant account 20-2 is not high. The predetermined number described above is previously stored in a storage apparatus that can be accessed from the determination unit 2020.

Herein, an object detected from image data 32 may be an object of any kind, and may be an object of a specific kind. In a case of the latter, for example, only a person among objects included in the image data 32 is to be detected.

Note that an existing technique can be used as a technique for detecting an object from image data and a technique for determining a similarity degree between detected objects.

<<<Comparison Method 2 Related to Image Data>>>

Figure 5:
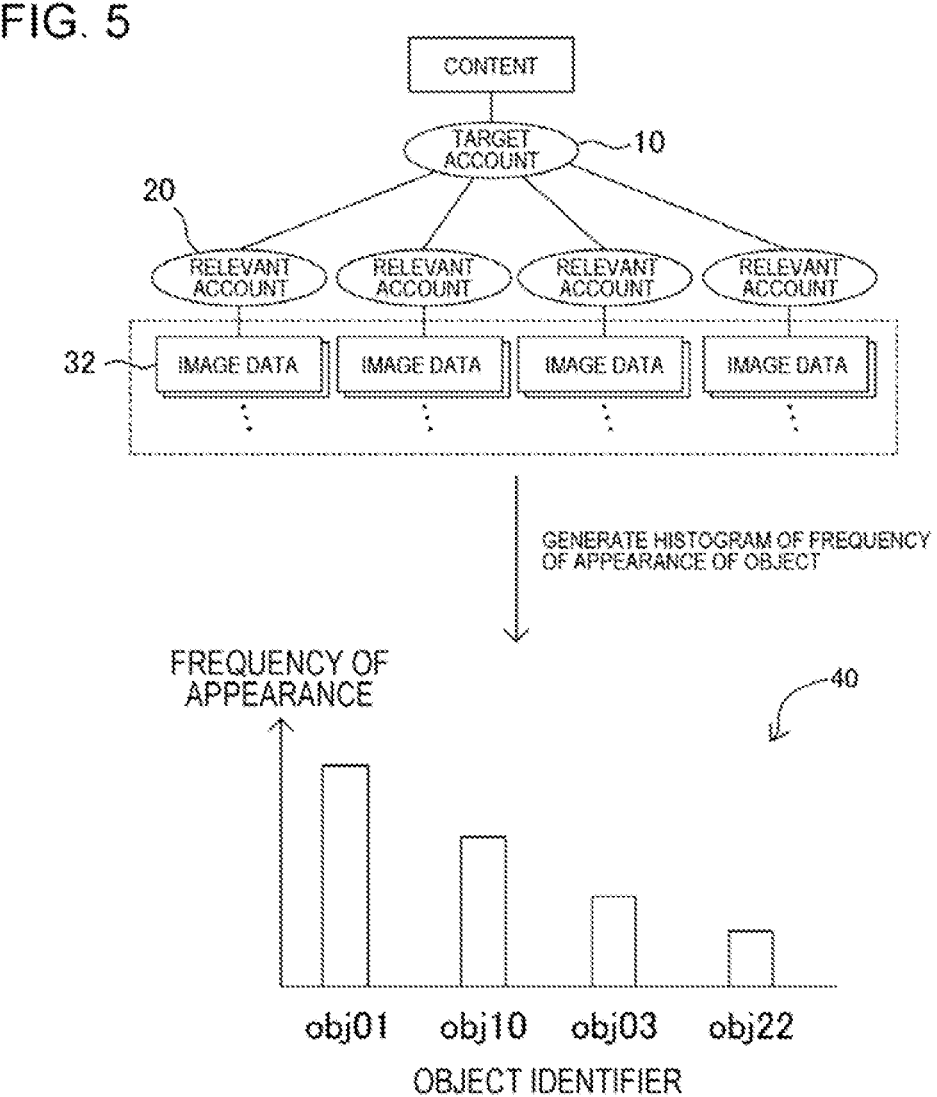
FIG. 5 is a diagram illustrating a histogram generated for a relevant account.

The determination unit 2020 generates, for each of the relevant account 20-1 and the relevant account 20-2, a histogram representing a distribution of a frequency of appearance of an object in image data associated thereto, and determines a similarity degree between the histograms. FIG. 5 is a diagram illustrating a histogram generated for the relevant account 20. In FIG. 5, a plurality of pieces of image data 32 are associated with the relevant account 20. A histogram 40 is a distribution of a frequency of appearance of an object detected from the image data 32. Hereinafter, the image data 32 associated with the relevant account 20-1 are expressed as image data 32-1, and the histogram 40 generated for the image data 32-1 is expressed as a histogram 40-1. Similarly, the image data 32 associated with the relevant account 20-2 are expressed as image data 32-2, and the histogram 40 generated for the image data 32-2 is expressed as a histogram 40-2.

The determination unit 2020 determines a similarity degree between the histogram 40-1 and the histogram 40-2. For example, the determination unit 2020 calculates the similarity degree between the histogram 40-1 and the histogram 40-2, and, when the calculated similarity degree is equal to or more than a predetermined value, the determination unit 2020 determines that a similarity degree between the content 30-1 and the content 30-2 is high. On the other hand, when the similarity degree between the histogram 40-1 and the histogram 40-2 is less than the predetermined value, the determination unit 2020 determines that the similarity degree between the content 30-1 and the content 30-2 is not high. Herein, an existing technique can be used as a technique for calculating a similarity degree between two histograms. Further, the predetermined value described above is stored in a storage apparatus that can be accessed from the determination unit 2020.

The histogram 40-1 and the histogram 40-2 are generated as follows, for example. First, the determination unit 2020 recognizes an object included in each piece of the image data 32-1 by performing object recognition processing on each piece of the image data 32-1 as a target. Furthermore, the determination unit 2020 generates the histogram 40-1 representing a distribution of a frequency of appearance of an object by counting the number of appearances of each object.

Herein, the determination unit 2020 assigns an identifier to each object detected from the image data 32-1. At this time, for example, the determination unit 2020 makes each object identifiable by assigning the same identifier to the same object, and can thus count the number of appearances of the object. In order to achieve this, a determination (identification of an object) of whether each object detected from the image data 32 is the same is needed. In other words, when the determination unit 2020 assigns an identifier to an object detected from the image data 32, and the object is the same as another object being already detected, the determination unit 2020 assigns the same identifier as an identifier assigned to the object being already detected. On the other hand, when the object is different from any objects being already detected, the determination unit 2020 assigns a new identifier that is not assigned to any object.

The determination unit 2020 generates the histogram 40-2 by also performing similar processing on the image data 32-2. At this time, for an object detected from the image data 32-2, not only identification with an object detected from the other piece of image data 32-2 but also identification with an object detected from the image data 32-1 are performed. In other words, when the same object as an object detected from the image data 32-2 is already detected from the image data 32-1, the determination unit 2020 also assigns, to the object detected from the image data 32-2, an identifier assigned to the object being already detected. Various types of existing techniques can be used for identification of an object.

Herein, a comparison between the histogram 40-1 and the histogram 40-2 may be performed by using only a part of the histogram 40-1 and a part of the histogram 40-2. For example, the determination unit 2020 calculates a similarity degree between the histogram 40-1 and the histogram 40-2 by comparing a frequency of appearance of objects in top N places (N is a natural number of two or more) in the histogram 40-1 with a frequency of appearance of objects in top N places in the histogram 40-2.

<<<Comparison Method 3 Related to Image Data>>>

A comparison related to image data may be achieved by a comparison between topics of the image data instead of a comparison between objects detected from the image data. Herein, a topic in a certain piece of data refers to a main matter or event expressed by the data. For example, a topic such as work, food, sports, traveling, games, or politics is conceivable. The determination unit 2020 classifies each piece of the image data 32 associated with the relevant account 20 by topic. Herein, an existing technique can be used as a technique for classifying image data by topic.

Figure 6:
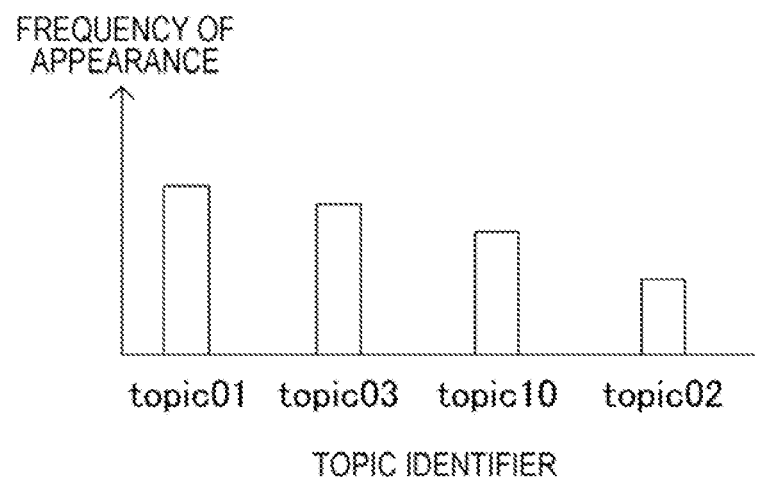
FIG. 6 is a diagram illustrating a histogram of a topic.

For example, the determination unit 2020 generates a histogram of a frequency of appearance of a topic for each of the image data 32-1 and the image data 32-2. FIG. 6 is a diagram illustrating a histogram of a topic. When a similarity degree between a histogram of a topic generated from the image data 32-1 and a histogram of a topic generated from the image data 32-2 is equal to or more than a predetermined value, the determination unit 2020 determines that a similarity degree between the content 30-1 and the content 30-2 is high. On the other hand, when the similarity degree between the histogram of the topic generated from the image data 32-1 and the histogram of the topic generated from the image data 32-2 is less than the predetermined value, the determination unit 2020 determines that the similarity degree between the content 30-1 and the content 30-2 is not high.

<<Comparison Related to Text Data>>

The determination unit 2020 may perform a comparison similar to the above-described comparison related to the image data 32 on text data associated with the relevant account 20. For example, in the SNS, text data representing information such as a thought of a user and a recent state of a user are uploaded in association with a user account. The determination unit 2020 handles, for example, text data uploaded by a user in such a manner as the content 30.

In addition, for example, a user may also make a post that refers to a Web page, a post that refers to text data uploaded by another user, a post of a comment on a content of another user, and the like. The determination unit 2020 may also handle, as content data associated with an account of the user, the text data included in the Web page referred by the user in such a manner, the text data uploaded by the another user, and the text data representing the comment on the content of the another user. Hereinafter, a few specific comparison methods related to text data are illustrated.

<<<Comparison Method 1 Related to Text Data>>>

For example, the determination unit 2020 performs extraction of a keyword from text data associated with the relevant account 20-1 and text data associated with the relevant account 20-2. For example, when the number of keywords that appear commonly to both pieces of the text data is equal to or more than a predetermined number, the determination unit 2020 determines that a similarity degree between the content 30-1 and the content 30-2 is high. On the other hand, when the number of keywords that appear commonly to both pieces of the text data is less than the predetermined number, the determination unit 2020 determines that the similarity degree between the content 30-1 and the content 30-2 is not high.

Herein, a keyword extracted from text data may be any word, and may be a specific word. In a case of the latter, for example, a list of words to be adopted as a keyword is previously prepared, and only a word included in the list is extracted as a keyword. Note that an existing technique can be used as a technique for extracting a keyword from text data.

<<<Comparison Method 2 Related to Text Data>>>

For example, the determination unit 2020 may perform, on a keyword extracted from text data associated with the relevant account 20, a comparison similar to the comparison related to a histogram of a frequency of appearance of an object detected from image data associated with the relevant account 20. Specifically, the determination unit 2020 generates, for each of the relevant account 20-1 and the relevant account 20-2, a histogram representing a distribution of a frequency of appearance of a keyword in associated text data, and determines a similarity degree between the histograms.

Figure 7:
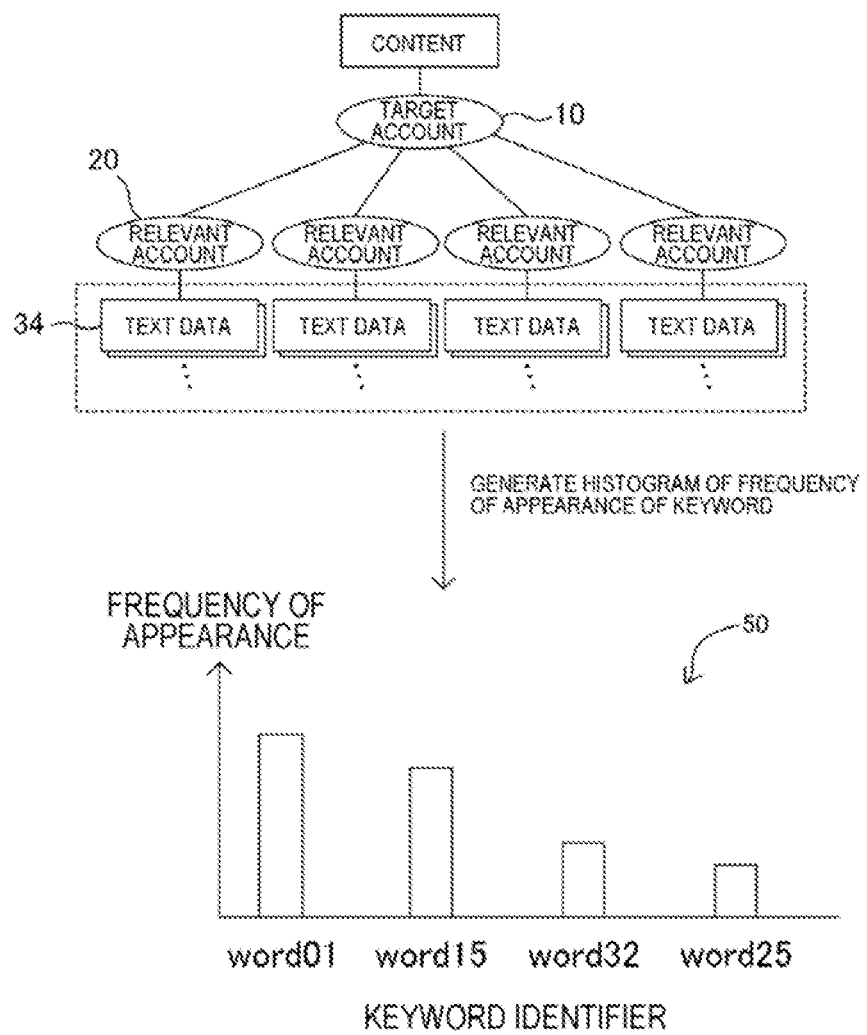
FIG. 7 is a diagram illustrating a histogram of a frequency of appearance of a keyword.

FIG. 7 is a diagram illustrating a histogram of a frequency of appearance of a keyword. In FIG. 7, a histogram 50 is generated for text data 34 associated with the relevant account 20. Hereinafter, the text data 34 associated with the relevant account 20-1 is expressed as text data 34-1, and the histogram 50 generated from the text data 34-1 is expressed as a histogram 50-1. Similarly, the text data 34 associated with the relevant account 20-2 is expressed as text data 34-2, and the histogram 50 generated from the text data 34-2 is expressed as a histogram 50-2.

For example, the determination unit 2020 calculates a similarity degree between the histogram 50-1 and the histogram 50-2, and, when the similarity degree is equal to or more than a predetermined value, the determination unit 2020 determines that a similarity degree between the content 30-1 and the content 30-2 is high. On the other hand, when the similarity degree between the histogram 50-1 and the histogram 50-2 is less than the predetermined value, the determination unit 2020 determines that the similarity degree between the content 30-1 and the content 30-2 is not high. The predetermined value described above is previously stored in a storage apparatus that can be accessed from the determination unit 2020.

Herein, a comparison between the histogram 50-1 and the histogram 50-2 may be performed by using only a part (for example, up to the top N place) of the histogram similarly to the comparison between the histogram 40-1 and the histogram 40-2.

<<<Comparison Method 3 Related to Text Data>>>

The determination unit 2020 may determine a similarity degree between the content 30-1 and the content 30-2 by a comparison between frequencies of appearance of a topic extracted from the pieces of the text data 34. A method of comparing frequencies of appearance of a topic extracted from the pieces of the text data 34 is similar to the above-described comparison between frequencies of appearance of a topic extracted from pieces of image data. Note that an existing technique can be used as a technique for extracting a topic from text data.

<<Comparison Related to Voice Data>>

The determination unit 2020 may handle voice data associated with the relevant account 20 as the content 30. The voice data herein include not only data generated by voice alone, but also data about voice included in moving image data. Hereinafter, comparison methods related to voice data are illustrated.

<<<Comparison Method 1 Related to Voice Data>>>

The determination unit 2020 extracts a keyword from each piece of voice data associated with the relevant account 20-1 and voice data associated with the relevant account 20-2. Then, the determination unit 2020 determines a similarity degree between the content 30-1 and the content 30-2 by handling the keywords extracted from the pieces of the voice data similarly to the keywords extracted from the pieces of the text data described above. In other words, the determination unit 2020 determines a similarity degree between the content 30-1 and the content 30-2 by comparing the numbers of common keywords and histograms representing a frequency of appearance of a keyword.

<<<Comparison Method 2 Related to Voice Data>>>

The determination unit 2020 determines a similarity degree between the content 30-1 and the content 30-2 by comparing a frequency of appearance of a topic extracted from voice data associated with the relevant account 20-1 and a frequency of appearance of a topic extracted from voice data associated with the relevant account 20-2. A method of comparing frequencies of appearance of a topic is similar to the above-described comparison between frequencies of appearance of a topic extracted from image data. Note that an existing technique can be used as a technique for extracting a topic from voice data.

<<<Comparison Method 3 Related to Voice Data>>>

The determination unit 2020 performs extraction of a speaker from each piece of voice data associated with the relevant account 20-1 and voice data associated with the relevant account 20-2. An existing technique such as voice print identification, for example, can be used as a technique for performing extraction of a speaker from voice data. For example, there is a technique for identifying a speaker by generating sound spectrogram data representing a voice print from voice data, and using the sound spectrogram data as identification information.

Figure 8:
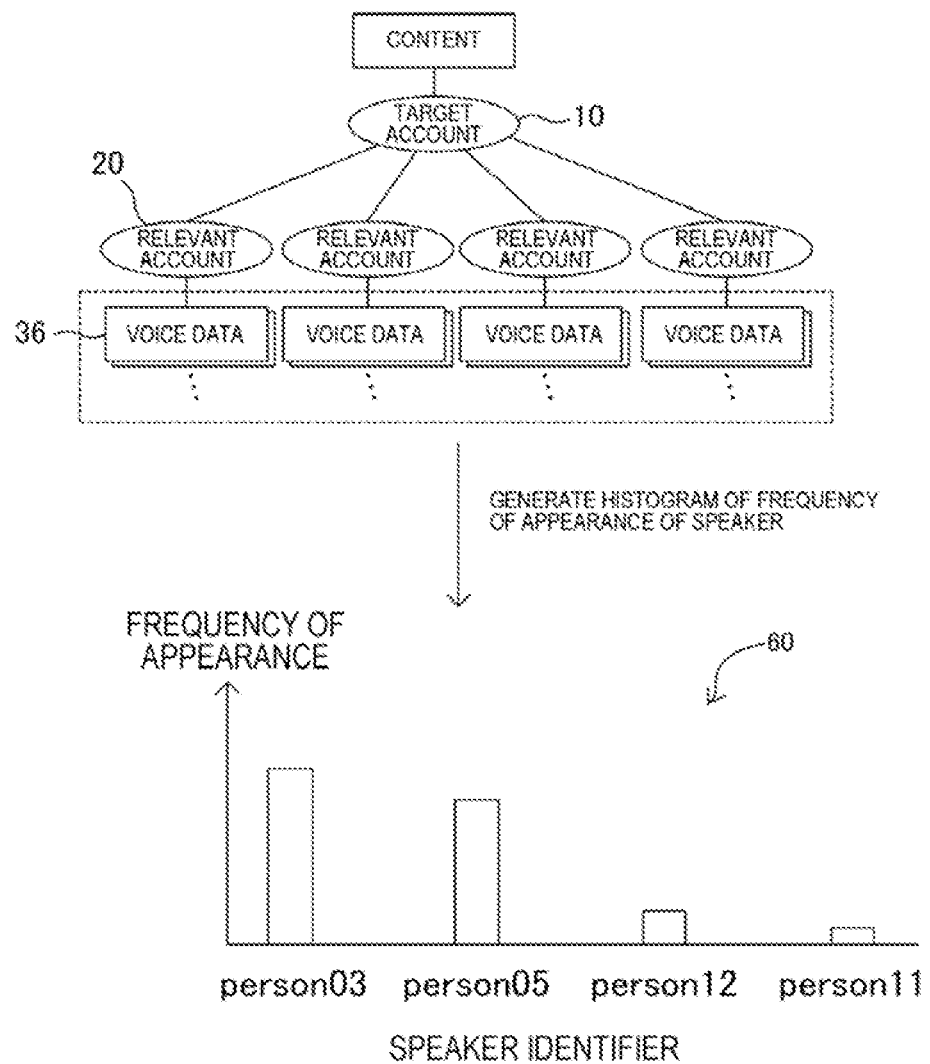
FIG. 8 is a diagram illustrating a histogram of a frequency of appearance of a speaker.

For example, the determination unit 2020 generates, for each of the relevant account 20-1 and the relevant account 20-2, a histogram of a frequency of appearance of a speaker extracted from associated voice data. FIG. 8 is a diagram illustrating a histogram of a frequency of appearance of a speaker. In FIG. 8, a histogram 60 of a frequency of appearance of a speaker is generated for voice data 36 associated with the relevant account 20. Hereinafter, the voice data 36 associated with the relevant account 20-1 is expressed as voice data 36-1, and the histogram 60 generated from the voice data 36-1 is expressed as a histogram 60-1. Similarly, the voice data 36 associated with the relevant account 20-2 is expressed as voice data 36-2, and the histogram 60 generated from the voice data 36-2 is expressed as a histogram 60-2.

For example, the determination unit 2020 calculates a similarity degree between the histogram 60-1 and the histogram 60-2, and, when the similarity degree is equal to or more than a predetermined value, the determination unit 2020 determines that a similarity degree between the content 30-1 and the content 30-2 is high. On the other hand, when the similarity degree between the histogram 60-1 and the histogram 60-2 is less than the predetermined value, the determination unit 2020 determines that the similarity degree between the content 30-1 and the content 30-2 is not high. The predetermined value described above is previously stored in a storage apparatus that can be accessed from the determination unit 2020.

Herein, a comparison between the histogram 60-1 and the histogram 60-2 may be performed by using only a part (for example, up to the top N place) of the histogram similarly to the comparison of the histogram 40 and the comparison of the histogram 50.

A comparison based on a speaker extracted from the voice data 36 is not limited to a comparison between histograms. For example, the determination unit 2020 may use a comparison method similar to the method described in "Comparison Method 1 Related to Text Data". In other words, when the number of speakers who appear commonly in the voice data 36 associated with the relevant account 20-1 and the voice data 36 associated with the relevant account 20-2 is equal to or more than a predetermined number, the determination unit 2020 determines that a similarity degree between the content 30-1 and the content 30-2 is high. On the other hand, when the number of speakers who appear commonly to both pieces of the voice data 36 is less than the predetermined number, the determination unit 2020 determines that the similarity degree between the content 30-1 and the content 30-2 is not high.

<Predetermined Processing>

As described above, when it is determined that a similarity degree between the content data 30-1 associated with the relevant account 20-1 and the content data 30-2 associated with the relevant account 20-2 is high, there is a high probability that the target account 10-1 and the target account 10-2 are owned by the same person. Thus, when it is determined that the similarity degree between the content 30-1 and the content 30-2 is high, the processing execution unit 2040 executes predetermined processing on the target account 10-1 and the target account 10-2. Hereinafter, a variation of the processing executed by the processing execution unit 2040 is illustrated.

<<Predetermined Processing 1>>

For example, when it is determined that the similarity degree between the content 30-1 and the content 30-2 is high, the processing execution unit 2040 outputs information representing that there is a high probability that the target account 10-1 and the target account 10-2 are owned by the same person. The information is output, and thus a user of the information processing apparatus 2000 who acquires the information can easily realize a group of the target accounts 10 having a high probability of being owned by the same person.

Figure 9:
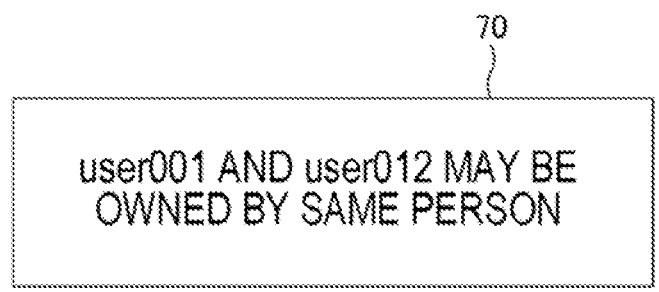
FIG. 9 is a diagram illustrating a notification displayed on a display apparatus.

There are various methods of outputting the information described above. For example, the processing execution unit 2040 causes a display apparatus connected to the information processing apparatus 2000 to display a notification representing that there is a high probability that the target account 10-1 and the target account 10-2 are owned by the same person. FIG. 9 is a diagram illustrating a notification displayed on the display apparatus. In addition, for example, the processing execution unit 2040 may transmit the notification described above to another computer communicably connected to the information processing apparatus 2000, or store the notification described above in a storage apparatus communicably connected to the information processing apparatus 2000.

Further, it is assumed that the information processing apparatus 2000 performs a determination by the determination unit 2020 on a plurality of combinations of the target account 10-1 and the target account 10-2. In this case, a plurality of combinations of the target accounts 10 having a high probability of being owned by the same person may be found. Thus, the processing execution unit 2040 may generate a list indicating one or more combinations of the target accounts 10 having a high probability of being owned by the same person, and output the list by various methods described above. By outputting such a list, a user of the information processing apparatus 2000 can easily realize the plurality of groups of the target accounts 10 having a high probability of being owned by the same person.

<<Predetermined Processing 2>>

In addition, for example, when it is determined that the similarity degree between the content 30-1 and the content 30-2 is high, the processing execution unit 2040 outputs information related to the content 30-1 and the content 30-2. Hereinafter, the information is referred to as similar content information. By outputting similar content information, a user of the information processing apparatus 2000 can acquire, for the target account 10-1 and the target account 10-2 inferred to have a high probability of being owned by the same person, information as grounds for the inference. Hereinafter, a variation of the similar content information is illustrated.

<<<Variation 1: Image of Object>>>

It is assumed that the determination unit 2020 performs a comparison between objects extracted from the pieces of the image data 32. In this case, for example, the processing execution unit 2040 includes, in the similar content information, the histogram 40 (see FIG. 5) representing a frequency of appearance of an object being generated for the image data 32. Herein, an image of each object indicated in the histogram 40 may be included together with the histogram 40 in the similar content information. In addition, for example, the processing execution unit 2040 includes, in the similar content information, a combination of images of objects determined to be similar to each other among objects extracted from the image data 32-1 and objects extracted from the image data 32-2. Note that, when an image of an object is included in the similar content information, the entire image data 32 in which the object is included may be included in the similar content information.

Furthermore, the processing execution unit 2040 may execute analysis processing on an image of an object to be included in the similar content information, and include a result of the analysis processing in the similar content information. For example, when there is an image of a person among object images to be included in the similar content information, the processing execution unit 2040 may infer an attribute (age, height, body shape, and gender) of the person of the image, and include a result of the inference in the similar content information, or may calculate a feature of an accessory object (such as glasses, clothing, and baggage) of the person of the image, and include information related to the feature in the similar content information. In addition, for example, the processing execution unit 2040 may extract an image of a part (such as a face, a mole, a tattoo, a nail, or a fingerprint) representing a feature of a person from the image of the person, and include the image of the part in the similar content information.

In addition, for example, when there is an image of a vehicle (such as a car, a motor cycle, and a bicycle) among object images to be included in the similar content information, the processing execution unit 2040 determines a maker of the vehicle, a type of the vehicle, a number of a number plate, and the like, and includes the determined information in the similar content information.

In addition, for example, when there is an image of a landmark (such as a building, a marking, a mountain, a river, and the sea) usable for identifying a capturing place (a place where the image data 32 is generated) among object images to be included in the similar content information, the processing execution unit 2040 includes a name of the landmark in the similar content information. Further, the processing execution unit 2040 may identify a location of the landmark, and include information (an address or global positioning system (GPS) coordinates) representing the location in the similar content information. Note that a location of a landmark can be identified by using map information and the like, for example.

<<<Variation 2: Keyword>>>

It is assumed that the determination unit 2020 performs a comparison between keywords extracted from text data or voice data. In this case, for example, the processing execution unit 2040 includes, in the similar content information, the histogram (see FIG. 7) generated for a keyword. At this time, each keyword indicated in the histogram may be included in the similar content information. In addition, for example, the processing execution unit 2040 includes, in the similar content information, a keyword determined to coincide among keywords extracted from the content 30-1 and keywords extracted from the content 30-2.

Note that, when a keyword is extracted from text data, the processing execution unit 2040 may include, in the similar content information, not only a keyword determined to coincide, but also a sentence and the entire text data in which the keyword is included. Further, when a keyword is extracted from voice data, the processing execution unit 2040 may include, in the similar content information, not only a keyword determined to coincide, but also voice data of a statement in which the keyword is included and the entire voice data from which the keyword is extracted.

<<<Variation 3: Speaker>>>

It is assumed that the determination unit 2020 performs extraction of a speaker from voice data. In this case, for example, the determination unit 2020 includes, in the similar content information, the histogram 60 (see FIG. 8) representing a frequency of appearance of a speaker. At this time, sound spectrogram data of each speaker indicated in the histogram may be included in the similar content information. In addition, for example, the determination unit 2020 includes, in the similar content information, sound spectrogram data of a speaker determined to coincide among speakers extracted from the voice data 36-1 and speakers extracted from the voice data 36-2.

<<<Variation 4: Topic>>>

It is assumed that the determination unit 2020 performs a comparison between topics extracted from the content 30. In this case, for example, the processing execution unit 2040 includes, in the similar content information, the histogram (see FIG. 6) representing a frequency of appearance of a topic extracted from the content 30. In addition, for example, the processing execution unit 2040 includes, in the similar content information, information (such as a name of a topic) representing a topic determined to coincide among topics extracted from the content 30-1 and topics extracted from the content 30-2.

While the example embodiments of the present invention have been described with reference to the drawings, the example embodiments are only exemplification of the present invention, and various configurations other than the above-described example embodiments can also be employed.

For example, when the content 30-1 and the content 30-2 are similar, the information processing apparatus 2000 may infer that an "owner of the target account 10-1 and an owner of the target account 10-2 belong to the same group" instead of inferring that "the target account 10-1 and the target account 10-2 are owned by the same person". In this case, the processing execution unit 2040 outputs "information representing that there is a high probability that the owner of the target account 10-1 and the owner of the target account 10-2 belong to the same group" instead of "information representing that there is a high probability that the target account and the target account 10-2 are owned by the same person".

The invention claimed is:

1. An information processing apparatus, comprising:
at least one memory configured to store instructions; and
at least one processor configured to execute the instructions to perform operations, the operations comprising:
identifying a first target account and a second target account from a plurality of user accounts;
identifying at least one first relevant account associated with the first target account and at least one second relevant account associated with the second target account;
acquiring, by crawling web pages, first content data associated with the at least one first relevant account and second content data associated with the at least one second relevant account, wherein the first content data and the second content data are voice data;
determining, for a first relevant account associated with a first target account and a second relevant account associated with a second target account, whether the first content data associated with the first relevant account and the second content data associated with the second relevant account are similar, wherein determining whether the first content data and the second content data are similar includes extracting one or more objects from the first content data and the second content data, extracting attributes from each object of the one or more objects, determining a similarity between each object extracted from the first content data and each object extracted from the second content data, and based on a number of pairs of objects between the first and second content data having above a threshold amount of similarity being above a threshold quantity, wherein the objects are keywords, wherein extracting attributes includes generating sound spectrograms from the first content data and the second content data, and wherein determining the similarity between each object includes comparing the sound spectrograms, determining that the first content data and second content data are similar; and
in response to determining that the first content data and the second content data are similar, executing predetermined processing to output notification information representing that there is high probability that a same user owns the first target account and the second target account when it is determined that the first content data and the second content data are similar,
wherein the operations comprise determining that the first and second content data are similar when a number of pairs of objects whose similarity is greater than a predetermined value is greater than a predetermined number between the first content data and the second content data.

2. The information processing apparatus according to claim 1, wherein the operations further comprise assigning the same identifier to the objects whose similarity is greater than the predetermined value, and counting the number of times the objects appear.

3. The information processing apparatus according to claim 1, wherein the objects are persons, vehicles or landmarks.

4. A control method executed by a computer, comprising:
    identifying a first target account and a second target account from a plurality of user accounts;
    identifying at least one first relevant account associated with the first target account and at least one second relevant account associated with the second target account;
    acquiring, by crawling web pages, first content data associated with the at least one first relevant account and second content data associated with the at least one second relevant account, wherein the first content data and the second content data are voice data;
    determining, for a first relevant account associated with a first target account and a second relevant account associated with a second target account, whether the first content data associated with the first relevant account and the second content data associated with the second relevant account are similar, wherein determining whether the first content data and the second content data are similar includes extracting one or more objects from the first content data and the second content data, extracting attributes from each object of the one or more objects, determining a similarity between each object extracted from the first content data and each object extracted from the second content data, and based on a number of pairs of objects between the first and second content data having above a threshold amount of similarity being above a threshold quantity, wherein the objects are keywords, wherein extracting attributes includes generating sound spectrograms from the first content data and the second content data, and wherein determining the similarity between each object includes comparing the sound spectrograms, determining that the first content data and second content data are similar; and
    in response to determining that the first content data and the second content data are similar, executing predetermined processing to output notification information representing that there is high probability that a same user owns the first target account and the second target account when it is determined that the first content data and the second content data are similar,
    wherein the control method comprises determining that the first and second content data are similar when a number of pairs of objects whose similarity is greater than a predetermined value is greater than a predetermined number between the first content data and the second content data.

5. The control method according to claim 4, further comprising assigning the same identifier to the objects whose similarity is greater than the predetermined value, and counting the number of times the objects appear.

6. A non-transitory computer-readable medium storing a program for causing a computer to perform operations, the operations comprising:
    identifying a first target account and a second target account from a plurality of user accounts;
    identifying at least one first relevant account associated with the first target account and at least one second relevant account associated with the second target account;
    acquiring, by crawling web pages, first content data associated with the at least one first relevant account and second content data associated with the at least one second relevant account, wherein the first content data and the second content data are voice data;
    determining, for a first relevant account associated with a first target account and a second relevant account associated with a second target account, whether the first content data associated with the first relevant account and the second content data associated with the second relevant account are similar, wherein determining whether the first content data and the second content data are similar includes extracting one or more objects from the first content data and the second content data, extracting attributes from each object of the one or more objects, determining a similarity between each object extracted from the first content data and each object extracted from the second content data, and based on a number of pairs of objects between the first and second content data having above a threshold amount of similarity being above a threshold quantity, wherein the objects are keywords, wherein extracting attributes includes generating sound spectrograms from the first content data and the second content data, and wherein determining the similarity between each object includes comparing the sound spectrograms, determining that the first content data and second content data are similar; and
    in response to determining that the first content data and the second content data are similar, executing predetermined processing to output notification information representing that there is high probability that a same user owns the first target account and the second target account when it is determined that the first content data and the second content data are similar,
    wherein the operations comprise determining that the first and second content data are similar when a number of pairs of objects whose similarity is greater than a predetermined value is greater than a predetermined number between the first content data and the second content data.

7. The non-transitory computer-readable medium according to claim 6, wherein the operations further comprise assigning the same identifier to the objects whose similarity is greater than the predetermined value, and counting the number of times the objects appear.

* * * * *